(12) United States Patent
Toshev et al.

(10) Patent No.: US 8,955,771 B2
(45) Date of Patent: Feb. 17, 2015

(54) DEVICE FOR INJECTING A LIQUID INTO AN EXHAUST GAS FLOW AND EXHAUST GAS AFTERTREATMENT SYSTEM

(71) Applicants: Plamen Toshev, Augsburg (DE); Stephan Schlüter, Augsburg (DE)

(72) Inventors: Plamen Toshev, Augsburg (DE); Stephan Schlüter, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 14/051,063

(22) Filed: Oct. 10, 2013

(65) Prior Publication Data
US 2014/0102084 A1 Apr. 17, 2014

(30) Foreign Application Priority Data
Oct. 11, 2012 (DE) .......................... 10 2012 019 951

(51) Int. Cl.
F01N 3/00 (2006.01)
F01N 3/02 (2006.01)
F01N 3/10 (2006.01)
F01N 3/20 (2006.01)
F01N 3/18 (2006.01)

(52) U.S. Cl.
CPC ................ *F01N 3/18* (2013.01); *F01N 3/2066* (2013.01); *F01N 2610/02* (2013.01); *F01N 2610/08* (2013.01); *F01N 2610/1453* (2013.01); *Y02T 10/24* (2013.01)
USPC ............... 239/405; 239/399; 60/286; 60/295; 60/324

(58) Field of Classification Search
USPC ...................... 60/286, 295, 324; 239/399, 405
See application file for complete search history.

(56) References Cited

U.S. PATENT DOCUMENTS

| 4,555,059 A | 11/1985 | Collins et al. |
| 6,045,058 A * | 4/2000 | Dobbeling et al. .............. 239/11 |
| 6,158,676 A * | 12/2000 | Hughes .......................... 239/405 |
| 6,192,677 B1 | 2/2001 | Tost |
| 6,782,902 B2 | 8/2004 | Shover et al. |
| 6,883,730 B2 * | 4/2005 | Eberspach et al. ............. 239/403 |
| 7,658,339 B2 * | 2/2010 | Prociw et al. .................. 239/406 |
| 8,276,366 B2 | 10/2012 | Bennet et al. |
| 2007/0045114 A1 | 3/2007 | Wang et al. |

FOREIGN PATENT DOCUMENTS

| DE | 35 01 145 A1 | 2/1986 |
| DE | 44 07 780 A1 | 10/1995 |
| DE | 195 07 365 A1 | 9/1996 |
| DE | 198 56 366 C1 | 4/2000 |
| DE | 601 23 382 T2 | 8/2007 |
| DE | 10 2009 017 016 A1 | 10/2010 |
| WO | WO 2005/013944 A1 | 2/2005 |

* cited by examiner

*Primary Examiner* — Thomas Denion
*Assistant Examiner* — Dapinder Singh
(74) *Attorney, Agent, or Firm* — Cozen O'Connor

(57) ABSTRACT

A device for injecting a liquid, particularly an aqueous urea solution, into an exhaust gas flow has at least one atomizing nozzle which is designed as a two-component nozzle and by means of which the liquid is injected into the exhaust gas flow by means of pressurized air such that the liquid can be mixed with the pressurized air first directly upon exiting, or after exiting, the respective atomizing nozzle outside of the atomizing nozzle. The atomizing nozzle, or each atomizing nozzle, has a nozzle base body, a nozzle air cap and a nozzle insert which are formed as turning parts. The respective atomizing nozzle can be connected to a nozzle lance via the nozzle base body, and the nozzle air cap and the nozzle insert are received and held in the nozzle base body.

9 Claims, 4 Drawing Sheets

DEVICE FOR INJECTING A LIQUID INTO AN EXHAUST GAS FLOW AND EXHAUST GAS AFTERTREATMENT SYSTEM

BACKGROUND OF THE INVENTION

1. Field of the Invention

The invention is directed to a device for injecting a liquid into an exhaust gas flow and to an exhaust gas aftertreatment system.

2. Description of the Related Art

It is a characteristic of internal combustion engines operated with heavy oil that the fuel that is used, i.e., the heavy oil, has a high sulfur content. Sulfur oxides can react with other constituents of the exhaust gas and lead to deposits that impair the efficiency of the exhaust gas cleaner.

An internal combustion engine with an exhaust gas turbocharger and an exhaust gas cleaner is known from DE 10 2004 027 593 A1. The exhaust gas turbocharger is constructed either as a one-stage exhaust gas turbocharger or as a two-stage exhaust gas turbocharger. The exhaust gas cleaner comprises a SCR catalyst, which is positioned either downstream of the turbine of the exhaust gas turbocharger or upstream of the turbine of the exhaust gas turbocharger in the one-stage exhaust gas turbocharger. For a two-stage exhaust gas turbocharger, the SCR catalyst is positioned between a high-pressure turbine of a high-pressure exhaust gas turbocharger and a low-pressure turbine of a low-pressure exhaust gas turbocharger.

A SCR catalyst uses ammonia as reductant. In exhaust gas aftertreatment systems known in the art, an aqueous urea solution is injected into the exhaust gas upstream of the SCR catalyst, this aqueous urea solution being decomposed and evaporated in the exhaust gas flow to form water vapor, carbon dioxide and ammonia.

The urea solution is preferably introduced into the exhaust gas flow by an atomizing nozzle, which can be constructed as a one-component nozzle or as a two-component nozzle, DE 10 2009 005 528 A1 discloses an atomizing nozzle designed as a two-component nozzle which serves to introduce a liquid into the exhaust gas flow of an exhaust gas aftertreatment system using pressurized air. The liquid to be atomized in the exhaust gas flow and the pressurized air are first mixed directly upon exiting the two-component nozzle. The liquid to be atomized and the pressurized air are guided separately within the two-component nozzle.

SUMMARY OF THE INVENTION

Against this background, it is the object of the invention to provide a novel device for injecting a liquid into an exhaust gas flow and to provide an exhaust gas aftertreatment system. This object is met by a device in which the atomizing nozzle, or each atomizing nozzle, comprises a nozzle base body, a nozzle air cap and a nozzle insert, which are formed as turning parts. The respective atomizing nozzle can be connected to a nozzle lance via the nozzle base body. The nozzle air cap and the nozzle insert are received and held in the nozzle base body. The atomizing nozzle, or each atomizing nozzle, of the device according to the invention is advantageously constructed in a simple manner. The atomizing nozzle, or each atomizing nozzle, makes do with three turning parts, namely, the nozzle base body, the nozzle air cap and the nozzle insert, thus minimizing production costs for the atomizing nozzle, or each atomizing nozzle, and therefore for the device according to the invention. The nozzle base body of the respective atomizing nozzle serves to connect the respective atomizing nozzle to the nozzle lance. The nozzle lance serves to feed the liquid to be atomized and the pressurized air separately in direction of the respective atomizing nozzle. The nozzle air cap and the nozzle insert are received and held in the nozzle base body and guide the liquid to be atomized and the pressurized air separately so that the liquid to be atomized can first be mixed with the pressurized air directly upon exiting, or after exiting, from the respective atomizing nozzle.

According to an aspect of the present invention, the nozzle base body of the respective atomizing nozzle preferably has a first portion for connection of the nozzle lance, and a central feed bore for the liquid and a plurality, namely, a first quantity, of lateral feed bores for pressurized air which communicate with corresponding lines in the nozzle lance are formed at this first portion of the nozzle base body. Further, the nozzle base body of the respective atomizing nozzle has a second portion for receiving the nozzle air cap and the nozzle insert, and a central discharge bore for the liquid which communicates with the central feed bore for the liquid and a plurality, namely, a second quantity, of lateral discharge bores for pressurized air which communicate with the lateral feed bores for pressurized air are formed at this second portion of the nozzle base body, and the second quantity of lateral discharge bores for pressurized air is greater than the first quantity of lateral feed bores for pressurized air. This construction of the atomizing nozzle, or of each atomizing nozzle, ensures an efficient cooling of the respective atomizing nozzle by the pressurized air so that overheating of the respective atomizing nozzle can be prevented.

In another aspect, the nozzle insert preferably defines a liquid flow structure communicating with the central liquid discharge bore of the nozzle base body, and the nozzle air cap partially concentrically surrounds the nozzle insert so as to form a pressurized air flow structure communicating with the lateral pressurized air discharge bores of the nozzle base body. This allows the nozzle air cap and the nozzle insert to be connected to the nozzle base body in a particularly simple manner.

According to an advantageous further aspect, the nozzle insert projects beyond the nozzle air cap at an outlet-side end such that an outlet opening for the pressurized air lies upstream of an outlet opening for the liquid viewed in the flow direction of the liquid. The nozzle insert preferably has a plurality of swirl slots that are inclined in a circumferential direction thereof and through which the pressurized air can be guided and torsionally accelerated.

In another aspect, these two features, namely, the protruding of the nozzle insert beyond the nozzle air cap and the swirl slots in the nozzle insert, are preferably applied in combination, which ensures a fine atomization of the liquid to be atomized in the exhaust gas flow with a low pressurized air requirement. The operating costs can be reduced through the reduced pressurized air requirement.

In accordance with another aspect of the present invention, an exhaust gas after treatment system is provided using the device for injecting liquid described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiment examples of the invention are described more fully with reference to the drawings without limiting the invention to these exemplary embodiments. In the drawings.

DETAILED DESCRIPTION OF THE PRESENTLY PREFERRED EMBODIMENTS

Disclosed embodiments of the invention are directed to a device for injecting a liquid into an exhaust gas flow, namely a device for atomizing an aqueous urea solution in an exhaust gas flow guided in an exhaust gas aftertreatment system, and further to an exhaust gas aftertreatment system using the device.

The urea solution atomized in the exhaust gas flow by means of the device is decomposed in the exhaust gas flow to form water vapor, carbon dioxide and ammonia vapor. The ammonia is used as reductant in a SCR catalyst of the exhaust gas aftertreatment system. The device accordingly injects the urea solution into the exhaust gas flow upstream of the SCR catalyst considered in flow direction of the exhaust gas.

Figure 1:
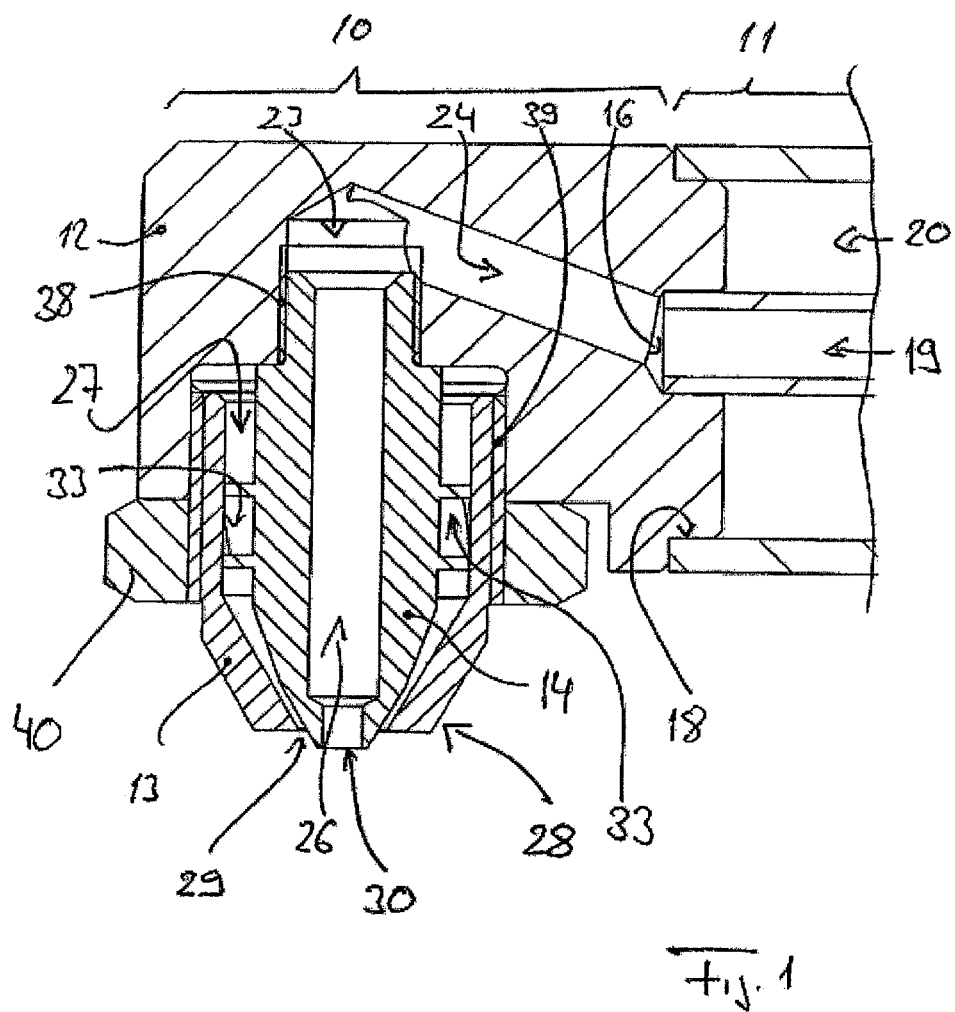
FIG. 1 is a cross section through a device according to the invention for injecting a liquid into an exhaust gas flow in the region of an atomizing nozzle of the device.

FIG. 1 shows a section of a device according to an exemplary embodiment of the invention that injects, i.e., atomizes, a liquid, namely, an aqueous urea solution, into an exhaust gas flow in the region of an atomizing nozzle 10, which is formed as two-component nozzle and which is connected to a nozzle lance 11.

The liquid to be atomized and the pressurized air which serves to atomize the liquid in the exhaust gas flow are guided separately in the atomizing nozzle 10, formed as two-component nozzle, and are mixed first directly upon exiting, or after exiting, from the two-component nozzle. Accordingly, the mixing of pressurized air and liquid to be atomized takes place outside of the atomizing nozzle 10.

A plurality of atomizing nozzles 10 can be connected to the nozzle lance 11, in which case liquid can be introduced into the exhaust gas flow via each atomizing nozzle 10.

The atomizing nozzle 10 shown in FIG. 1 comprises three turning parts, namely, a nozzle base body 12, a nozzle air cap 13 and a nozzle insert 14. The nozzle base body 12 serves on the one hand to connect the atomizing nozzle 10 to the nozzle lance 11 and on the other hand to receive the nozzle air cap 13 and the nozzle insert 14.

Figure 2A:
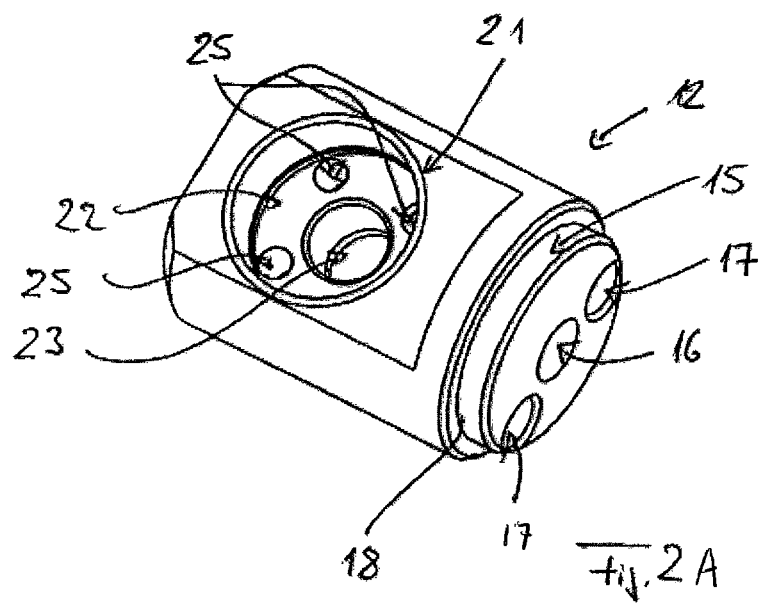
FIGS. 2A to 2B are different views of a nozzle base body of an atomizing nozzle.
Figure 2B:
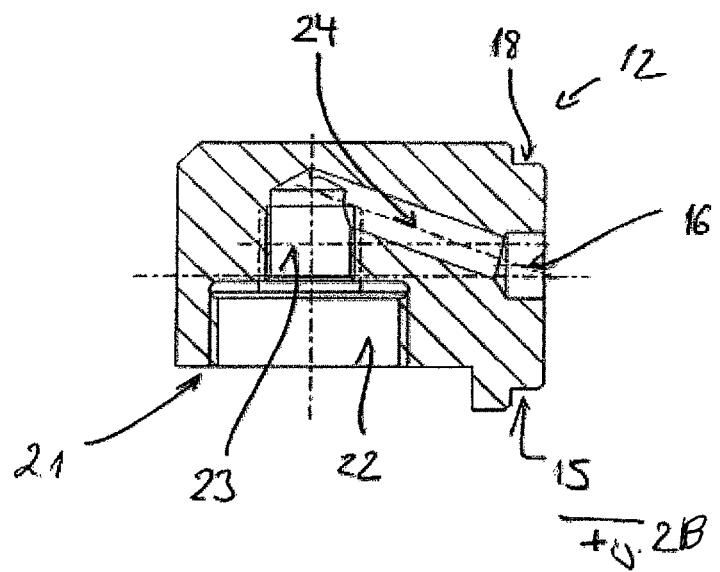

The nozzle base body 12 of the atomizing nozzle 10, shown in different views in FIGS. 2A and 2B, has a first portion 15 for connecting the nozzle base body 12 to the nozzle lance 11. A central feed bore 16 for the liquid to be atomized and a plurality, namely, a first quantity N1, of lateral feed bores 17 for pressurized air, are formed at this first portion 15 of the nozzle base body 12.

In the exemplary embodiment illustrated in FIGS. 2A and 2B, two lateral feed bores 17 for pressurized air are formed at the first portion 15 of the nozzle base body 12. These two lateral feed bores 17 are diametrically opposed with respect to the individual central feed bore 16 for the liquid.

A circumferential shoulder 18, by which the nozzle base body 12 of the atomizing nozzle 10 can be fitted to the nozzle lance 11, is formed externally in the region of the first portion 15. When the nozzle base body 12 of the atomizing nozzle 10 is connected to the nozzle lance 11, a flow channel 19 of the nozzle lance 11 for the liquid communicates with the central feed bore 16 of the nozzle base body 12 for the liquid. Further, a flow channel 20 of the nozzle lance 11 for the pressurized air communicates in this state with the lateral feed bores 17 of the nozzle base body 12 for the pressurized air.

In addition to the first portion 15 by which the nozzle base body 12 can be connected to the nozzle lance 11, the nozzle base body 12 of the atomizing nozzle 10 also has a second portion 21 serving to receive the nozzle air cap 13 and nozzle insert 14. A recess 22 is formed at this second portion 21 of the nozzle base body 12, and the nozzle air cap 13 and nozzle insert 14 can be partially inserted into the recess 22 so as to be fastened and held at the nozzle base body 12.

A central discharge bore 23 for the liquid to be atomized, via which the liquid to be atomized can be discharged from the nozzle base body 12 and fed to the nozzle insert 14, is formed in the region of the recess 22. This central discharge bore 23 for the liquid communicates with the central feed bore 16 for the liquid, namely, in the exemplary illustrated embodiment, via a diagonally extending connection bore 24.

Further, with reference to FIG. 2A, a plurality, namely a second quantity N2, of lateral discharge bores 25 for pressurized air are formed in the region of the recess 22 for the nozzle air cap 13 and the nozzle insert 14. These lateral discharge bores 25 are arranged in the circumferential direction around the central discharge bore 23 for the liquid to be atomized. The lateral discharge bores 25 for the pressurized air communicate with the lateral feed bores 17 for the pressurized air so that the pressurized air supplied to the nozzle base body 12 via the lateral feed bores 17 can be discharged from the nozzle base body 12 via the lateral discharge bores 25 and guided in direction of the nozzle air cap 13 and nozzle insert 14.

The second quantity N2 of lateral discharge bores 25 for pressurized air is preferably greater than the first quantity N1 of lateral feed bores 17 for the pressurized air. In the exemplary illustrated embodiment, the second quantity N2 of lateral discharge bores 25 for the pressurized air corresponds to twice the first quantity N1 of lateral feed bores 17 for the pressurized air. In the exemplary illustrated embodiment, four lateral discharge bores 25 for pressurized air and two lateral feed bores 17 for pressurized air are formed at the nozzle base body 12. Every lateral feed bore 17 for pressurized air communicates with two lateral discharge bores 25 for pressurized air.

The above-described configuration of bores 17 and 25 in the nozzle base body 12, which guide the pressurized air, allows for efficient cooling of the atomizing nozzle 10 by the pressurized air so as to prevent overheating of the atomizing nozzle 10.

As described above, the nozzle insert 14 and the nozzle air cap 13 are received and held in the recess 22 at the second portion 21 of the nozzle base body 12. As can best be seen from FIG. 1, the nozzle insert 14 defines a liquid flow structure 26 for the liquid to be atomized that communicates with the central discharge bore 23 for the liquid of the nozzle base body 12.

In the assembled state of the atomizing nozzle 10, the nozzle air cap 13 surrounds the nozzle insert 14 partially concentrically, namely, so as to form a pressurized air flow structure 27 between the nozzle insert 14 and the nozzle air cap 13. The nozzle insert 14 defines the pressurized air flow structure 27 radially inwardly and the nozzle air cap 13 defines the pressurized air flow structure 27 radially outwardly. The pressurized air flow structure 27 communicates with the lateral discharge bores 25 for pressurized air of the nozzle base body 12.

In the region of an outlet-side end 28 of the atomizing nozzle 10, the nozzle air cap 13 and the nozzle insert 14 define an annular gap as outlet opening 29 for the pressurized air. This annular gap concentrically surrounds an outlet opening 30 for the liquid to be atomized, which outlet opening 30 is formed by the nozzle insert 14.

The outlet opening 29 for the pressurized air is arranged upstream of the outlet opening 30 for the liquid to be atomized considered in flow direction of the liquid to be atomized. Accordingly, at the outlet-side end 28 of the atomizing nozzle 10 with its outlet opening 30 for the liquid to be atomized, the nozzle insert 14 projects beyond the nozzle air cap 13 and, accordingly, the outlet opening 29 for the pressurized air. This allows a particularly fine atomization of the liquid to be atomized in the exhaust gas flow.

Figure 4A:
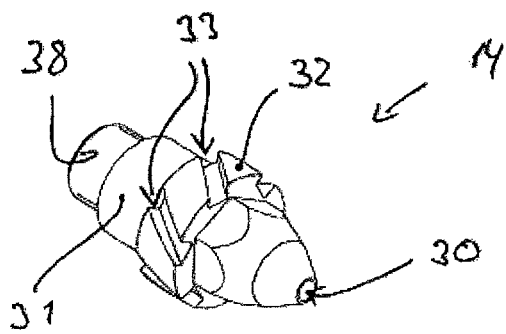
FIGS. 4A to 4C are different views of a nozzle insert of an atomizing nozzle.
Figure 4B:
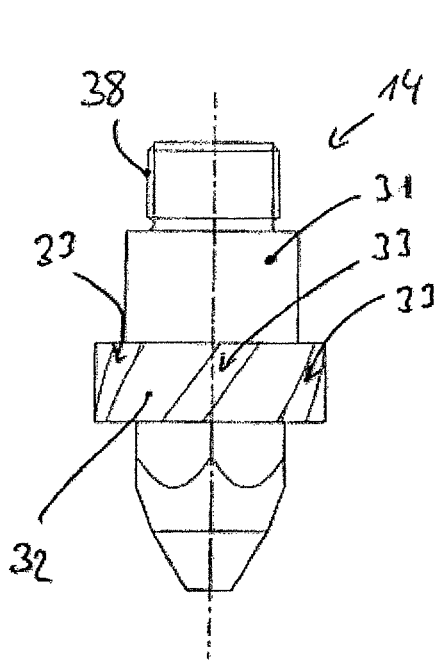
Figure 4C:
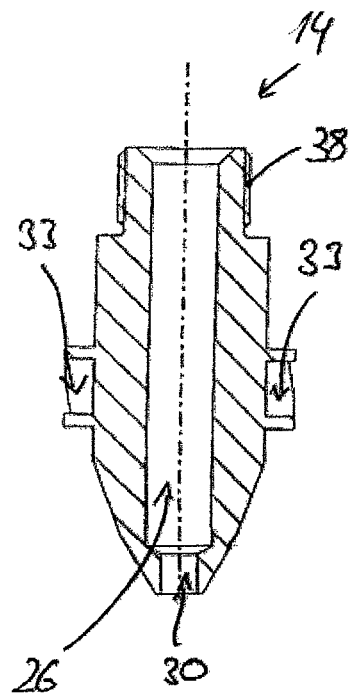

As can be seen in FIGS. 4A to 4C, the nozzle insert 14 has a base body 31 that defines the liquid flow structure 26 with the outlet opening 30 for the liquid to be atomized. A circumferential projection 32 is formed at this base body 31, and a plurality of swirl slots 33, for guiding the pressurized air, which are inclined in circumferential direction, are formed at this projection 32 and cause a torsional acceleration of the pressurized air, further enhancing the atomization of the liquid to be atomized in the exhaust gas flow.

As described above, the nozzle air cap 13 partially concentrically surrounds the nozzle insert 14 in the assembled state. To this end, as can be seen in FIG. 3B, the nozzle air cap 13 has a central recess 34 into which the nozzle insert 14 projects, and the nozzle insert 14 protrudes from this recess 34 at the outlet-side end 28 so as to form the outlet opening 29 for the pressurized air, this outlet opening 29 being formed as an annular gap.

Figure 3A:
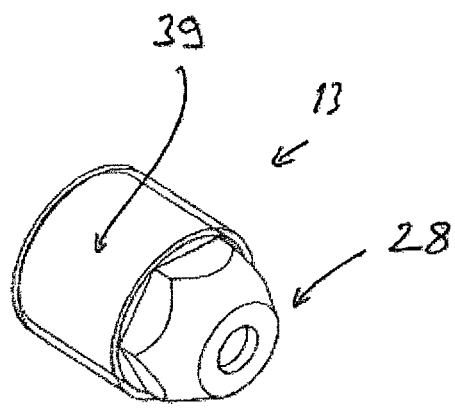
FIGS. 3A to 3B are different views of a nozzle air cap of an atomizing nozzle.
Figure 3B:
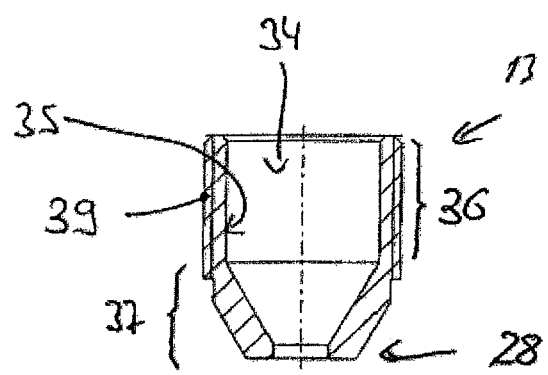

As shown in FIG. 3B, an inner contour 35 of the recess 34 of the nozzle air cap 13 has a cylindrical contour in a first portion 36 and a frustum-shaped contour in a second portion 37. In the assembled state, the projection 32 of the nozzle insert 14 having the swirl slots 33 adjoins the cylindrically contoured portion 36 of the inner contour 35 of the recess 34 of the nozzle air cap 13.

As shown in FIGS. 4A to 4C, the nozzle insert 14 has an external thread 38 at a portion opposing the outlet opening 30 and can be screwed to the nozzle base body 12 by means of this external thread 38.

As can be seen in FIGS. 3A and 3B, the nozzle air cap 13 likewise has an external thread 39 at a portion thereof opposing the outlet-side end 28. The nozzle air cap 13 can be screwed to the nozzle base body 12 by this external thread 39.

When the nozzle insert 14 and the nozzle air cap 13 are both screwed by their external threads 38 and 39 to corresponding internal threads of the nozzle base body 12, the component assemblies that are screwed to the nozzle base body 12, namely, the nozzle air cap 13 and nozzle insert 14, can be further secured to the nozzle base body 12 by a lock nut 40 which likewise cooperates with the external thread 39 of the nozzle air cap 13. Alternatively, the lock nut 40 may be omitted.

The atomizing nozzle 10 as described herein has a compact constructional form and achieves its functionality with only three turning parts. The construction is simple and the turning parts are easy to assemble. Further, the atomizing nozzle 10 can be mounted easily on the nozzle lance 11 by means of the nozzle base body 12 as described above.

The device for atomizing the liquid in an exhaust gas flow can have a plurality of atomizing nozzles 10 engaging at the nozzle lance 11. The quantity of atomizing nozzles 10 employed depends upon how much liquid, i.e., what amount of urea solution, is to be atomized in the exhaust gas flow. When a plurality of atomizing nozzles 10 are arranged at a nozzle lance 11, the last atomizing nozzle 10 considered in flow direction of the pressurized air and of the liquid to be atomized is formed as shown in the drawings. The atomizing nozzle 10, or each atomizing nozzle 10, arranged before this last atomizing nozzle 10 considered in flow direction additionally has bores communicating with the central discharge bore 23 and with the lateral discharge bores 25 in order to divert some of the pressurized air and some of the liquid to be atomized and guide it in direction of the atomizing nozzle 10, or each atomizing nozzle 10, arranged thereafter, via the channels 19, 20 of the nozzle lance 11 that communicate with these bores.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for injecting a liquid, particularly an aqueous urea solution, into an exhaust gas flow, the device comprising:
    at least one atomizing nozzle (10) configured to inject the liquid into the exhaust gas flow by pressurized air such that the liquid is mixed with the pressurized air directly upon exiting, or after exiting, the at least one atomizing nozzle (10),
    wherein the at least one atomizing nozzle (10) comprises a nozzle base body (12), a nozzle air cap (13), and a nozzle insert (14), each of which are turning parts,
    wherein the at least one atomizing nozzle (10) is configured to be connectable, via the nozzle base body (12), to a nozzle lance (11), and
    wherein the nozzle air cap (13) and the nozzle insert (14) are received and held in the nozzle base body (12).

2. The device according to claim 1, wherein the nozzle insert (14) has at a circumferential projection (32) thereof, a plurality of swirl slots (33), the swirl slots (33) being inclined in a circumferential direction thereof and through which the pressurized air is guided and torsionally accelerated.

3. The device according to claim 1, wherein the nozzle insert (14) projects beyond the nozzle air cap (13) at an outlet-side end (28) of the at least one atomizing nozzle (10) so as to form an outlet opening (29) for the pressurized air that lies upstream of an outlet opening (30) for the liquid, with respect to the flow direction of the liquid.

4. The device according to claim 1, wherein the at least one atomizing nozzle (10) comprises a plurality of atomizing nozzles (10), and the plurality of atomizing nozzles (10) are arranged at the nozzle lance (11).

5. The device according to claim 1, wherein:
- the nozzle base body (12) has a first portion (15) configured to connect to the nozzle lance (11),
- the first portion (15) has a central feed bore (16) for the liquid, and a plurality, of a first quantity, of lateral feed bores (17) for pressurized air, the central feed bore (16) and the lateral feed bores (17) being configured to communicate with corresponding lines (19, 20) in the nozzle lance,
- the nozzle base body (12) has a second portion (21) configured to receive the nozzle air cap (13) and the nozzle insert (14), and
- a central discharge bore (23), which communicates with the central feed bore (16) for the liquid, and a plurality, namely, a second quantity, of lateral discharge bores (25), which communicate with the lateral feed bores (17) for pressurized air, are formed at the second portion (21) of the nozzle base body (12), the second quantity of lateral discharge bores (25) being greater than the first quantity of lateral feed bores (17).

6. The device according to claim 5, wherein the second quantity of lateral discharge bores (25) corresponds to twice the first quantity of lateral feed bores (17), wherein each lateral feed bore (17) communicates with two lateral discharge bores (25).

7. The device according to claim 5, wherein the nozzle insert (14) defines a liquid flow structure (26) communicating with the central discharge bore (23), and the nozzle air cap (13) partially concentrically surrounds the nozzle insert (14) so as to form a pressurized air flow structure (27) communicating with the lateral discharge bores (25).

8. An exhaust gas aftertreatment system for an internal combustion engine, comprising a SCR catalyst using ammonia as a reductant, and a device for injecting a liquid comprising an aqueous urea solution, into an exhaust gas flow upstream of the SCR catalyst, wherein the device for injecting the liquid is constructed according to claim 1.

9. The exhaust gas aftertreatment system according to claim 8, wherein the internal combustion engine is a ship's diesel combustion engine operated with heavy oil.

* * * * *